United States Patent [19]

Galle et al.

[11] Patent Number: 4,727,942

[45] Date of Patent: Mar. 1, 1988

[54] COMPENSATOR FOR EARTH BORING BITS

[75] Inventors: Edward M. Galle, Friendswood; Anton F. Zahradnik, Sugarland, both of Tex.

[73] Assignee: Hughes Tool Company, Houston, Tex.

[21] Appl. No.: 927,789

[22] Filed: Nov. 5, 1986

[51] Int. Cl.$^4$ ................................................. E21B 7/00
[52] U.S. Cl. ..................................... 175/228; 175/372
[58] Field of Search ............... 175/227, 228, 229, 339, 175/371, 376

[56] References Cited

U.S. PATENT DOCUMENTS

| | | | |
|---|---|---|---|
| 2,342,355 | 2/1944 | Mercier | 138/30 |
| 2,724,442 | 2/1955 | Mundt | 166/225 |
| 3,007,751 | 11/1961 | Eenick | 308/187 |
| 3,370,659 | 11/1968 | Gatien | 175/318 |
| 3,476,195 | 11/1969 | Galle | 175/228 |
| 3,719,241 | 11/1971 | Bell | 175/228 |
| 3,844,364 | 10/1974 | Crow | 175/228 |
| 3,847,234 | 11/1974 | Schumacher | 175/228 |
| 3,935,911 | 2/1976 | McQueen | 175/17 |
| 3,995,367 | 12/1976 | Penny | 308/8.2 |
| 4,055,225 | 10/1977 | Millsapps | 175/228 |
| 4,073,548 | 2/1978 | Walters | 175/228 x |
| 4,168,868 | 9/1979 | Shields | 175/372 X |
| 4,407,375 | 10/1983 | Nakamura | 175/228 |

Primary Examiner—George A. Suchfield
Attorney, Agent, or Firm—Robert A. Felsman

[57] ABSTRACT

In an earth boring bit of the type having a rotatable cone secured to a bearing shaft, an improved pressure compensating and relief system. A flexible diaphragm has an enlarge peripheral portion in an o-ring configuration sealingly secured in a compensator cavity to form a mud region and a lubricant region. A central portion of the diaphragm has a perforated and ridged protrusion extending into the mud region to form a self energizing area, exposed to the mud region, that seals the perforation when the pressure of the lubricant is less than or substantially equal that of the mud. A wall at the end of the compensator cavity surrounds the mud passage and engages an area around the protrusion when the diaphragm is fully extended by lubricant pressure build-up that exceeds the hydrostatic pressure. Thus, the resulting pressure differential opens the perforation, releases lubricant and relieves the build-up of lubricant pressure. However, the configuration of the protrusion is such as to prevent the entrance of mud into the lubricant reservoir since the exterior area of the protrusion exceeds that of the interior area. The differential pressure to open the perforation is selected to be not less than about fifty psi and the preferred form of the protrusion is substantially cylindrical, its perforation and lubricant entrance being beveled. An absence of metal bonded to the diaphragm helps avoid failures due to stress induce separations and debonding due to chemical attack. Clearances are used between the diaphragm and the end of the cavity and the end of the protector cup to provide self centering with the lubricant and drilling mud passages.

12 Claims, 4 Drawing Figures

COMPENSATOR FOR EARTH BORING BITS

BACKGROUND OF THE INVENTION

1. Field of the Invention

This invention relates in general to earth boring bits but in particular to improvements in their lubricant pressure compensators and relief means.

2. Description of the Prior Art

Earth boring bits of the rolling cutter type have sealed bearings and lubrication systems that include pressure compensation and relief means to minimize the pressure differential across the seals that separate the lubricant from the drilling mud in a bore hole.

A successful seal means is disclosed by Edward M. Galle in U.S. Pat. No. 3,397,928. A successful pressure compensation and relief means is disclosed by Stuart C. Millsapps, Jr., in U.S. Pat. No. 4,055,225. Other systems include the use of the original commercially successful pressure relief valve disclosed by Galle in U.S. Pat. No. 3,476,195 and the use of a pinhole or slit in a flexible compensator or diaphragm that permits liquid flow either into or from the compensator cavity, as disclosed by Schumacher in U.S. Pat. No. 3,847,234.

The failure of any element in the lubrication system of a bit eventually, but usually soon, concludes its useful life. Too often, a life determinative failure occurs in either the diaphragm or the relief means. Varying stresses caused by the lubricant pressure variations in a bit, along with increased temperatures downhole, accelerate compensator failure, especially those which include metal components bonded to rubber.

SUMMARY OF THE INVENTION

It is the general object of the invention to provide an improved pressure compensating and relief system in an earth boring bit.

The improved comensator has a flexible diaphragm in a compensator cavity that minimizes tensile stresses in the diaphragm. Metal components are not used in the diaphragm to avoid the failures that occur in the bonded region between metal and rubber.

The flexible diaphragm has a perforated protrusion extending into the drilling mud region. The perforation is self energizing and seals when the pressure of the lubricant is less than or substantially equal to that of the mud that surrounds the bit during drilling. A wall at the end of a compensator cavity in the bit body contains a mud passage and engages an area of the compensator around the protrusion when the diaphragm is fully extended by lubricant pressure build-up that exceeds the hydrostatic pressure of the mud. This minimizes tensile stresses in the diaphragm. The resulting pressure differential opens the perforation, releases lubricant and relieves the build-up of lubricant pressure. This is accomplished in the preferred embodiment by utilizing a protrusion having a larger surface area in the mud region than in the lubricant region. In such an embodiment the exterior or mud site of the protrusion is cylindrical and a beveled entrance to the perforation is used on the lubricant side of the diaphragm. The protrusion ideally has an annular reinforcing ridge to confine the ends of the perforation, which is usually a slit. Further, the diaphragm has a periphery enlarged to accomodate an integral o-ring that is compressed between captive, preferably beveled surfaces on a compensator protector cup and the compensator cavity. The end of the diaphragm has clearance from the end of the compensator cavity and clearance from the end of the protector cup when fully extended but unstressed. This centers the protrusion when fully extended in either direction.

The above as well as additional objects, features, and advantages of the invention will become apparent in the following description.

DESCRIPTION OF THE PREFERRED EMBODIMENT

Figure 1:
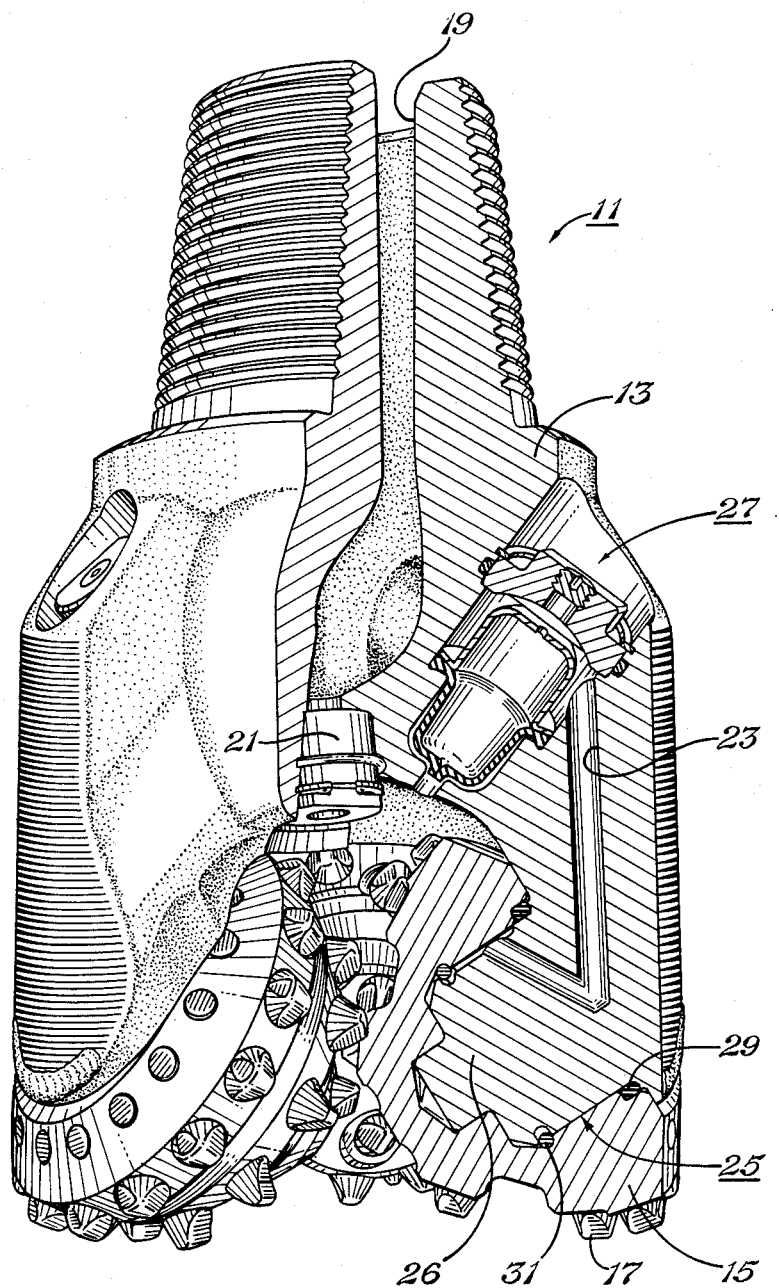
FIG. 1 is a perspective view, partially in longitudinal section, of an earth boring bit of the rolling cutter type having a lubricant compensator and pressure relief system constructed in accordance with the principles of the invention.

The numeral 11 in the drawing designates an earth boring bit which consists of three identical head sections 13, each of which supports a rotatable cutter 15 having a plurality of earth disintegrating teeth 17, here depicted as being inserts of sintered tungsten carbide.

Thus, the three head sections 13 together form a head or body having a hollow interior 19 which terminates at the lower end in usually three passages, each containing a nozzle 21 used to direct drilling fluid or mud against the borehole bottom (not shown).

A lubricant passage 23 in each head section extends between the bearing means 25 of a cantilevered bearing shaft 26 and a lubricant pressure compensator and relief means 27.

Lubricant is maintained in the bearing means 25 by a seal means 29, here an o-ring as shown in the previously mentioned Galle U.S. Pat. No. 3,397,928. Each rotatable cutter 15 is retained to the bearing shaft 26 by suitable means such as the snap ring, as disclosed by Burr, et al in U.S. Pat. No. 4,491,428.

Figure 2:
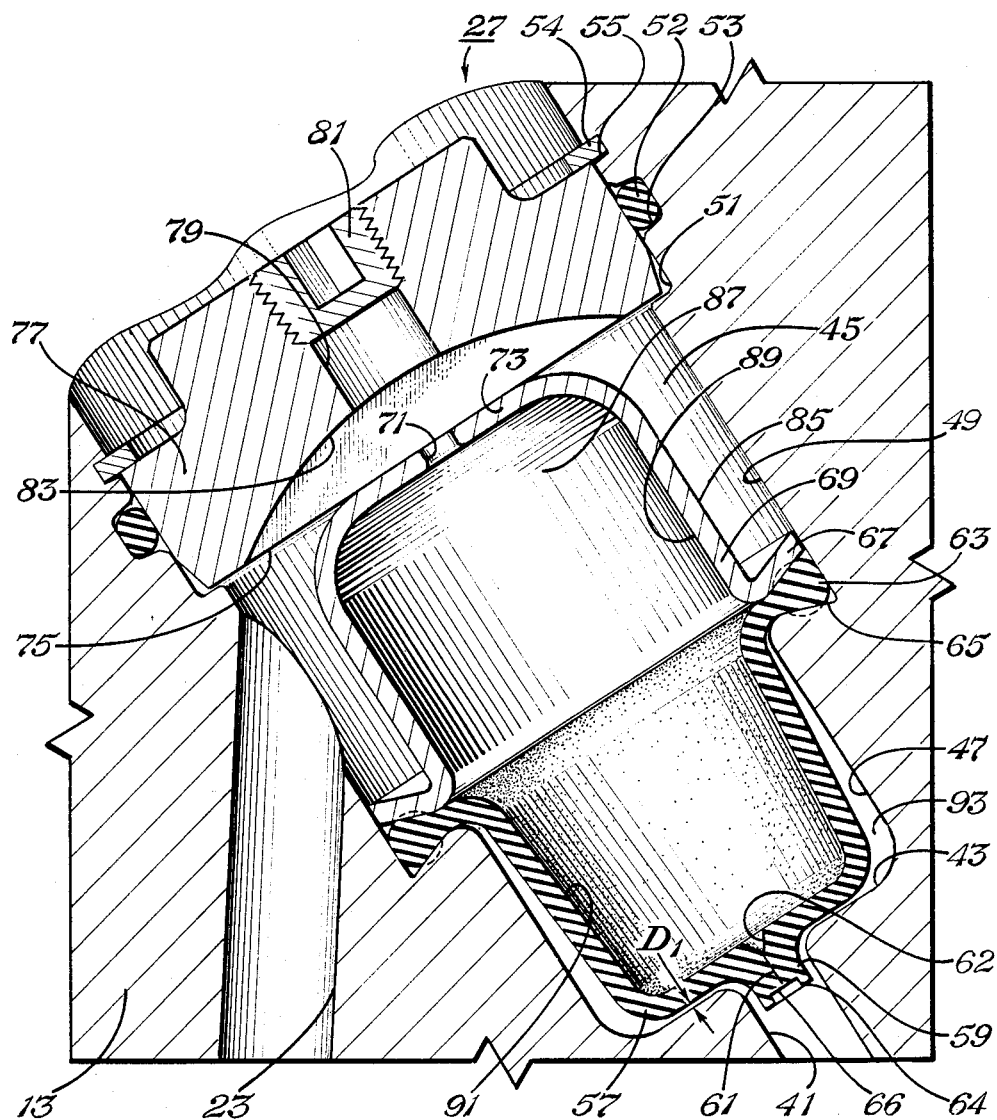
FIG. 2 is an enlarged, fragmentary longitudinal section of the lubricant compensator and pressure relief system shown in FIG. 1, showing the diaphragm filled with grease.

As shown in FIG. 2, a lubricant compensator and relief means 27 is positioned or formed in each of the head sections 13. A mud passage 41 leads to an interior body or wall surface 39 (see FIG. 1) on the interior of the bit above the rotatable cutters 15. An interior wall or shoulder 43 forms the lower part of a compensator cavity 45 which has a lower region 47 of one diameter and an upper region 49 of a larger diameter. A recess 51 contains an o-ring 52 in a groove or gland 53 and includes a snap ring 54 in a recess 55 is used to retain a compensator cap 77.

The lower region 47 of the compensator cavity 45 as shown in FIG. 2 contains a flexible diaphragm 57 that has a central portion 59 perforated at 61 and beveled at 62. The perforation 61 is actually a slit starting in a recess 64 having ends limited by an annular ridge 66. The periphery 63 of the diaphragm 57 is in the form of an o-ring shaped annular area that is compressed between an inverted incline or lip 65 in the cavity upper region 49 and an opposed downwardly facing beveled portion or shoulder 67 on the lower extremity of a protector cup 69. This cup has an aperture 71 in its upper portion 73, through which grease communicates with the lubricant passage 23.

The protector cup 69 is biased downwardly by a lower surface 75 in a compensator cap 77, which has a passage 79 through which lubricant is forced prior to insertion of a pressure seal pipe plug 81. An arcuate groove 83 permits lubricant flow freely between the passage 23 in the head section 13, around the exterior surface 85 of the protector cup 69, and to or from the interior volume 87 (defined by the interior surfaces 89 of the protector cup 69 and an interior surface 91 of the flexible diaphragm 57).

Upon assembly and in operation, the flexible diaphragm 57 has its periphery 63 compressed (indicated by the dotted lines) and is sealingly secured in the compensator cavity between surfaces 65, 67 to form a mud region 93 and a lubricant volume or region 87. The central portion 59 of the flexible diaphragm 57 has a perforation 61 and extends into passage 41 of mud region 93 when fully expanded to form a self energizing area, exposed to the drilling mud, that seals the perforation when the pressure of the lubricant is less than or substantially equal to that of the mud.

The wall or shoulder 43 at the lower end of the compensator cavity around the mud passage 41 engages the flexible diaphragm when fully extended by lubricant pressure build-up that exceeds the hydrostatic pressure of the drilling mud. Thus, the resulting pressure differential opens the perforation 61, releases the lubricant and relieves the build-up of lubricant pressure inside the lubricant volume 87.

The diaphragm is preferably constructed of nitrile rubber and the perforation is sized along with the configuration of central portion 59, such that it will open at a selected pressure not less than substantially fifty psi.

This self energizing effect is achieved in the preferred embodiment by utilizing a protrusion having an area exposed to the mud that is greater than the area exposed to the lubricant such that sealing of the perforation is effected for all mud pressures greater than the lubricant pressure. Preferably, the protrusion is cylindrical, with a radius joining the exterior surface of the flexible diaphragm 57, as indicated in FIG. 2.

The width of perforation or slit 61 is determined by the diameter of the annular ridge 66. Its length or depth is determined by the thickness of the diaphragm, the depth of bevel 62 and the height of central portion or appendage 59. All of these features determine the differential pressure at which the slit 61 is energized to release lubricant.

Figure 3:
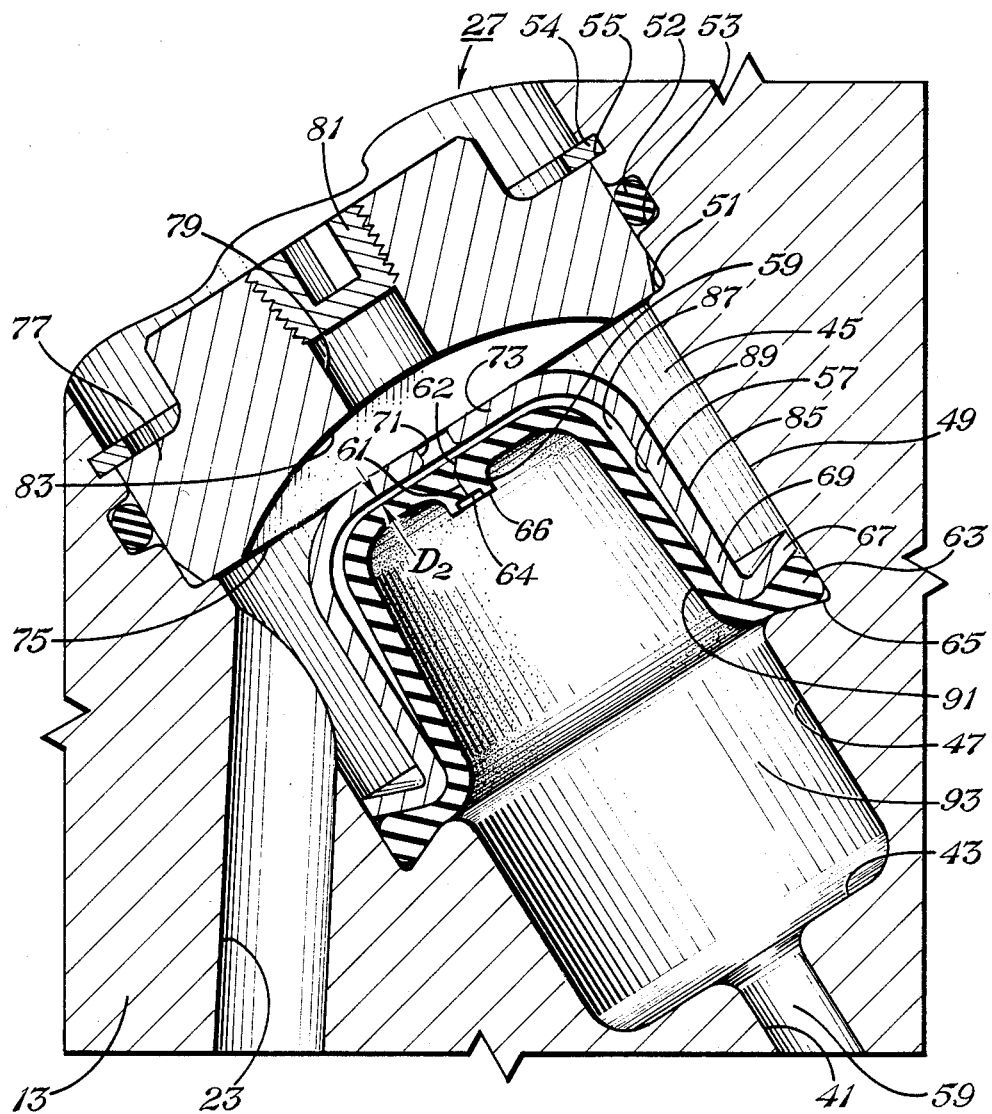
FIG. 3 is an enlarged, fragmentary longitudinal section, similar to that of FIG. 2, except the grease in the compensator has been expended and drilling mud has essentially filled the compensator.
Figure 4:
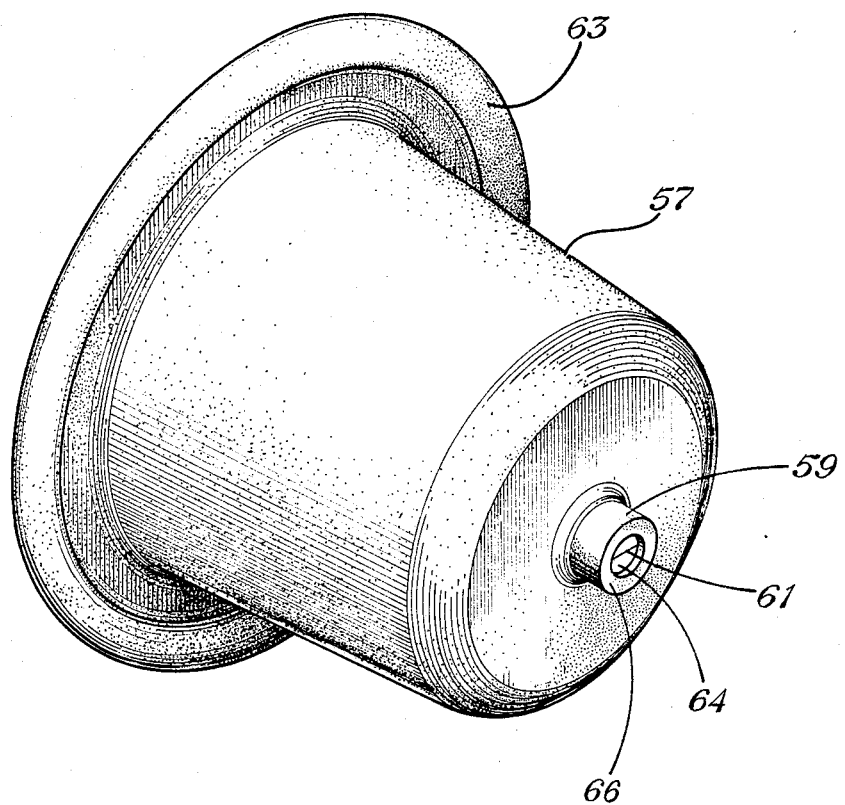
FIG. 4 is a perspective view of the flexible diaphragm of FIGS. 1 and 2.

Another feature of the invention are the clearances $D_1$ (see FIG. 2) and $D_2$ (see FIG. 3). These clearances occur when the flexible diaphragm is completely filled with lubricant (FIG. 2) or inverted by drilling mud (FIG. 3), but before the rubber is stretched. This self-centers the central portion or appendage 59 with respect to mud passage 41 (FIG. 2) and aperture 71 (Fig. 3). Otherwise, a relatively thin wall section of the diaphragm may align with either mud passage 41 or aperture 71 and a large pressure differential may rupture the diaphragm.

It is advantageous that the flexible diaphragm 57 is connected without bonding to the compensator cavity 45 by the compression of its periphery 63 between the surface 65 and the beveled portion 67 of the protector cup. Separation and failure of diaphragms or compensators have been observed when metal/rubber bonding is used. Such constructions may cause excessive stress in the rubber at the bonded areas during pressure build-up in the lubricant. Further, the use of a shoulder 43 in the compensator cavity 45 to engage the end of the perforated diaphragm minimizes stresses and enhances reliability. Additionally, the upper portion 73 and the opening 71 of protector cup 69 are designed to form a backup support for the central portion 59 of flexible diaphragm 57 so that when substantially higher mud pressure than lubricant pressure exists no damage will occur to the diaphragm.

While the invention has been described in only one of its forms, it should be apparent to those skilled in the art that it is not so limited, but is susceptible to various changes and modifications without departing from the spirit thereof.

We claim:

1. In combination with an earth boring bit having a rotatable cutter secured to a bearing shaft on a head, an improved pressure compensating and relief system which comprises:

seal means between the cutter and the bearing shaft;
   the head including a lubricant passage extending between the bearing shaft and a compensator cavity;
   the compensator cavity having one end exposed, by means of a mud passage, to mud in a borehole during drilling;
   a flexible diaphragm having a periphery sealingly secured in the compensator cavity to form a mud region and a lubricant region -- and to induce upon the lubricant the hydrostatic pressure of the mud in a borehole;
   a central portion of the diaphragm having a perforated protrusion extending into the mud region to form a self energizing configuration exposed to the mud region that seals the perforation when the pressure of the lubricant is less than or substantially equal that of the mud but that opens when the lubricant pressure exceeds the mud pressure by a selected value;
   a wall at the end of the compensator cavity surrounding the mud passage and engaging an area around the protrusion only when the diaphragm is extended by lubricant pressure build-up that exceeds the mud pressure to open the perforation by the selected value to release lubricant.

2. The invention defined by claim 1 which further comprises an exclusively rubber diaphragm with an enlarged peripheral portion and a rigid protector cup biased against and compressing the peripheral portion.

3. The invention defined by claim 2 wherein the end of the diaphragm has clearance from the end of the compensator cavity and clearance from the end of the protector cup when fully extended but unstressed to center the central portion of the diaphragm in the compensator cavity.

4. In combination with an earth boring bit having a rotatable cutter secured to a bearing shaft on a head, an improved pressure compensating and relief system which comprises:

seal means between the cutter and the bearing shaft;
   the head including a lubricant passage extending between the bearing shaft and a compensator cavity;
   the compensator cavity having one end exposed, by means of a mud passage, to mud in a borehole during drilling;
   a flexible diaphragm having a periphery sealingly secured in the compensator cavity to form a mud region and a lubricant region -- and to induce upon the lubricant the hydrostatic pressure of the mud in a borehole;

a central portion of the diaphragm having a perforated protrusion extending into the mud region to form a larger area of diaphragm around the perforation in the mud region than in the lubricant region to create a self energizing effect that seals the perforation when the pressure of the lubricant is less than or substantially equal that of the mud but that opens when the lubricant pressure exceeds the mud pressure by a selected value;

a wall at the end of the compensator cavity surrounding the mud passage and engaging an area around the protrusion only when the diaphragm is extended by lubricant pressure build-up that exceeds the hydrostatic pressure by a selected value;

whereby the resulting pressure opens the perforation, releases lubricant and relieves the build-up of lubricant pressure.

5. The invention defined by claim 4 which further comprises an exclusively rubber diaphragm with an enlarged peripheral portion and a rigid protector cup biased against and compressing the peripheral portion.

6. The invention defined by claim 5 wherein the end of the diaphragm has clearance from the end of the compensator cavity and clearance from the end of the protector cup when fully extended but unstressed to center the central portion of the diaphragm in the compensator cavity.

7. In combination with an earth boring bit having a rotatable cutter secured to a bearing shaft on a head, an improved pressure compensating and relief system which comprises:

seal means between the cutter and the bearing shaft;

the head including a lubricant passage extending between the bearing shaft and a compensator cavity;

the compensator cavity having one end exposed, by means of a mud passage, to mud in a borehole during drilling;

a flexible diaphragm having a periphery sealingly secured in the compensator cavity to form a mud region and a lubricant region -- and to induce upon the lubricant the hydrostatic pressure of the mud in a borehole;

a central portion of the diaphragm having a generally cylindrical, perforated protrusion extending into the mud region, with a beveled entry to the perforation exposed to the lubricant region, to form a larger area of diaphragm around the perforation in the mud region than in the lubricant region to create a self energizing effect that seals the perforation when the pressure of the lubricant is less than or substantially equal that of the mud but that opens when the lubricant pressure exceeds the mud pressure by a selected value;

a wall at the end of the compensator cavity surrounding the mud passage and engaging an area around the protrusion only when the diaphragm is extended by lubricant pressure build-up that exceeds the hydrostatic pressure by the selected value;

whereby the resulting pressure build-up opens the perforation, releases lubricant and relieves the build-up of lubricant pressure.

8. The invention defined by claim 7 which further comprises an exclusively rubber diaphragm with an enlarged peripheral portion and a rigid protector cup biased against and compressing the peripheral portion.

9. The invention defined by claim 8 wherein the end of the diaphragm has clearance from the end of the compensator cavity and clearance from the end of the protector cup when fully extended but unstressed to center the central portion of the diaphragm in the compensator cavity.

10. In combination with an earth boring bit having a rotatable cutter secured to a bearing shaft on a head, an improved pressure compensating and relief system which comprises:

seal means between the cutter and the bearing shaft;

the head including a lubricant pasasge extending between the bearing shaft and a compensator cavity;

the compensator cavity having one end exposed by a mud passage to mud in a borehole during drilling;

a compensator cup sealingly retained in the compensator cavity;

a flexible diaphragm without metal components having an enlarged periphery sealingly secured and compressed in the compensator cavity by pressure from the compensator cup to form a mud region and a lubricant region -- and to induce upon the lubricant the mud pressure of the mud in a borehole;

a wall at the end of the compensator cavity surrounding the mud passage to engage the flexible diaphragm around the enlarged periphery to cause expulsion of lubricant when the lubricant pressure exceeds the mud pressure;

pressure relief means in the flexible diaphragm to prevent the entrance of mud into the lubricant when the pressure of the lubricant is less than or substantially equal that of the mud but to expel lubricant upon lubricant pressure build-up to a selected value above the mud pressure.

11. The invention defined by claim 10 which further comprises an exclusively rubber diaphragm and a compensator cap to bias the compensator cup against the enlarged periphery of the diaphragm.

12. The invention defined by claim 11 wherein the end of the diaphragm has clearance from the end of the compensator cavity and clearance from the end of the protector cup when fully extended but unstressed to center the central portion of the diaphragm in the compensator cavity.

* * * * *